United States Patent
Virshup

(10) Patent No.: US 10,726,033 B2
(45) Date of Patent: Jul. 28, 2020

(54) AUTOMATED GRAPH LAYOUT USING METADATA

(71) Applicant: Autodesk, Inc.

(72) Inventor: Aaron Michael Virshup, San Leandro, CA (US)

(73) Assignee: AUTODESK, INC., San Rafael, CA (US)

( * ) Notice: Subject to any disclaimer, the term of this patent is extended or adjusted under 35 U.S.C. 154(b) by 24 days.

(21) Appl. No.: 15/646,799

(22) Filed: Jul. 11, 2017

(65) Prior Publication Data

US 2018/0067996 A1 Mar. 8, 2018

Related U.S. Application Data

(60) Provisional application No. 62/361,338, filed on Jul. 12, 2016.

(51) Int. Cl.
*G06F 16/24* (2019.01)
*G06T 11/20* (2006.01)
*G06F 16/248* (2019.01)
*G06F 16/2457* (2019.01)
*G06F 16/904* (2019.01)

(52) U.S. Cl.
CPC ...... *G06F 16/248* (2019.01); *G06F 16/24573* (2019.01); *G06F 16/904* (2019.01); *G06T 11/206* (2013.01)

(58) Field of Classification Search
CPC ......... G06F 17/30554; G06F 17/30994; G06F 17/30525; G06T 11/206
See application file for complete search history.

(56) References Cited

U.S. PATENT DOCUMENTS

| | | | |
|---|---|---|---|
| 2009/0030932 A1* | 1/2009 | Harik | G06F 17/30958 |
| 2015/0089424 A1* | 3/2015 | Duffield | G06Q 10/00 715/771 |
| 2015/0356166 A1* | 12/2015 | Daenen | G06F 17/30601 707/738 |
| 2016/0042534 A1* | 2/2016 | Tremblay | G06T 11/203 345/586 |
| 2016/0343005 A1* | 11/2016 | Liu | G06Q 30/0201 |

* cited by examiner

*Primary Examiner* — Tapas Mazumder
(74) *Attorney, Agent, or Firm* — Womble Bond Dickinson (US) LLP

(57) ABSTRACT

A method and apparatus of a device that computes a graph using non-visible metadata edges is described. In an exemplary embodiment, the device receives graph information for a plurality of nodes, wherein a first subset of the plurality of nodes is connected by visible edges. The device further determines a plurality of metadata edges for a second subset of nodes that are not connected by visible edges. The device additionally computes a graph using the plurality of metadata edges and presents the graph using a user interface.

20 Claims, 18 Drawing Sheets

| FIG. 3A | FIG. 3B |
| FIG. 3C | FIG. 3D |

702

704

| FIG. 10A | |
| --- | --- |
| FIG. 10B | FIG. 10C | FIG. 10D |

AUTOMATED GRAPH LAYOUT USING METADATA

CROSS-REFERENCE TO RELATED APPLICATION

This application is a non-provisional application of U.S. Provisional Patent Application No. 62/361,338 filed Jul. 12, 2016 and incorporated herein by reference.

FIELD OF INVENTION

This invention relates generally to computational technology and more particularly to using metadata to automate a graph layout.

BACKGROUND OF THE INVENTION

'Graphs' are a method of organizing information using connections between different pieces of information, which are used in several different technical fields A graph is a collection of objects (for example, Facebook users), and a set of connections between them (e.g., whether the users have 'friended' each other). In the field's jargon, the objects in a graph are called "nodes" (that can be drawn as dots or labels), and a connection between two nodes is referred to as an "edge".

Drawing graphs is often a difficult task, and a large amount of past and current research is devoted to devising visually informative graph layouts. One layout algorithm is the 'force-directed layout', where a physics-based simulation is used to draw the graph. Force-directed layouts have the advantage that they are very easy to set up, and can be generated automatically. However, these layouts (and many other automated layout methods) are often unintuitive, messy, and hard to understand.

SUMMARY OF THE DESCRIPTION

A method and apparatus of a device that computes a graph using non-visible metadata edges is described. In an exemplary embodiment, the device receives graph information for a plurality of nodes, wherein a first subset of the plurality of nodes is connected by visible edges. The device further determines a plurality of metadata edges for a second subset of nodes that are not connected by visible edges. The device additionally computes a graph using the plurality of metadata edges and presents the graph using a user interface.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
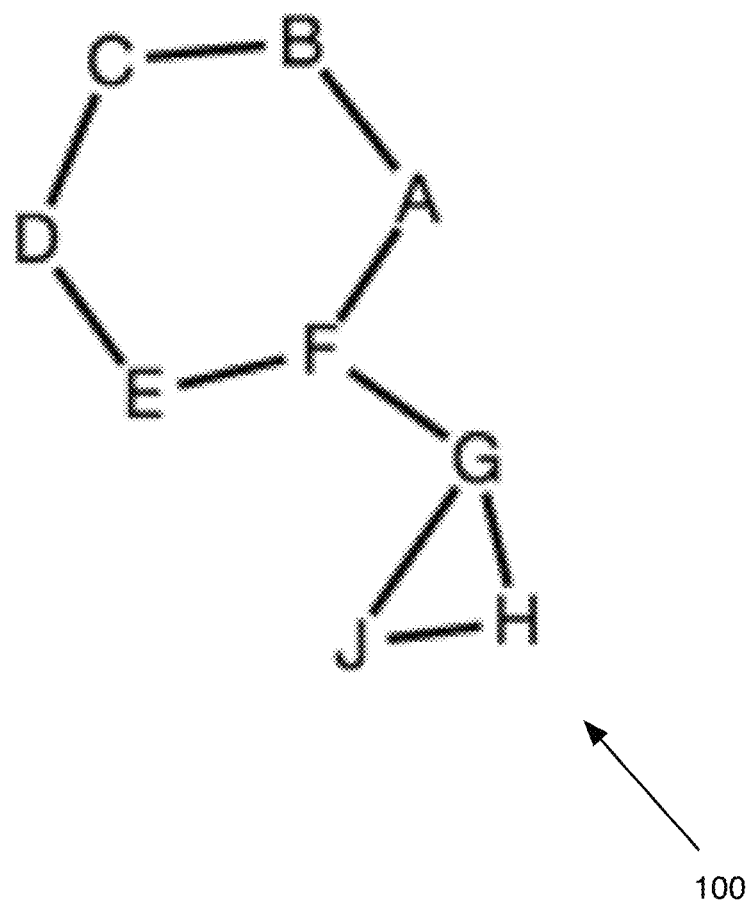
FIG. 1 is an illustration of one embodiment of a friendship graph.

A method and apparatus of a device that computes a graph using non-visible metadata edges is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that computes a graph using non-visible metadata edges is described. In one embodiment, to help create more intuitive, information-rich graphs, the device uses metadata information from outside a strict "graph" structure of the nodes and visible edges. Specifically, the device augments the graph with extra edges that influence the layout but are not shown to the user. In this embodiment, these "metadata edges" are used to guide the layout algorithm for computing the graph, are not made visible when the graph is presented, and do not affect the graph's structure. Specifically, the device uses a metadata-based "similarity metric" between different nodes in the graph. For this metric, $S(i,j) \in [0,1]$, the similarity between nodes i and j is 1 if they are maximally similar and 0 if they are maximally dissimilar. The graph is augmented with weighted "metadata" connections with weights $w_{ij} = w_0 \times S(i,j)$ where $W_0 > 0$ is a user-controllable parameter that represents the relative strength of the metadata edges.

In one embodiment, the computing of the metadata edges uses the following pseudo-code:

```
for i in xrange(num_nodes):
    for j in xrange(i+1,num_nodes):
        if connected[i,j]: continue    #   ignore pre-existing connections
        sim = similarity(i,j)
        if sim > 0:
            connected[i,j] = True
            weights[i,j] = w0 * sim
            opacity[i,j] = 0.0    #   makes the connection invisible
```

For instance, in the friendship graph below, we could create additional "invisible" connections between pairs of people who live in the same zip code, using this similarity metric:

$$S(i, j) = \begin{cases} 1 & \text{if } zipcode_i = zipcode_j \\ 0 & \text{otherwise} \end{cases}.$$

This metadata-augmented graph can be drawn using a standard automated-layout algorithm, such as a force-directed layout. However, with its invisible metadata edges, the generated layout would show not only strict friendship connections, but also be laid out in a way to group sets of neighbors with one another.

FIG. 1 is an illustration of one embodiment of a friendship graph 100. In FIG. 1, the friendship graph includes nodes of friends connected by edges. In one embodiment, graphs are a method of organizing information using connections between different pieces of information. In this embodiment, a graph is a collection of objects (e.g., social media users), and a set of connections between them (e.g., whether the users have 'friended' each other). These objects in a graph are called "nodes", and a connection between two nodes is referred to as an "edge". For example and in one embodiment, the graph 100 is a collection of 9 people illustrated as nodes A-I. In this example, to see who is a friend with whom, friend nodes are coupled with edges that illustrate the friend connectivity. In this graph are "nodes", while a friendship between them are "edges."

Figure 2:
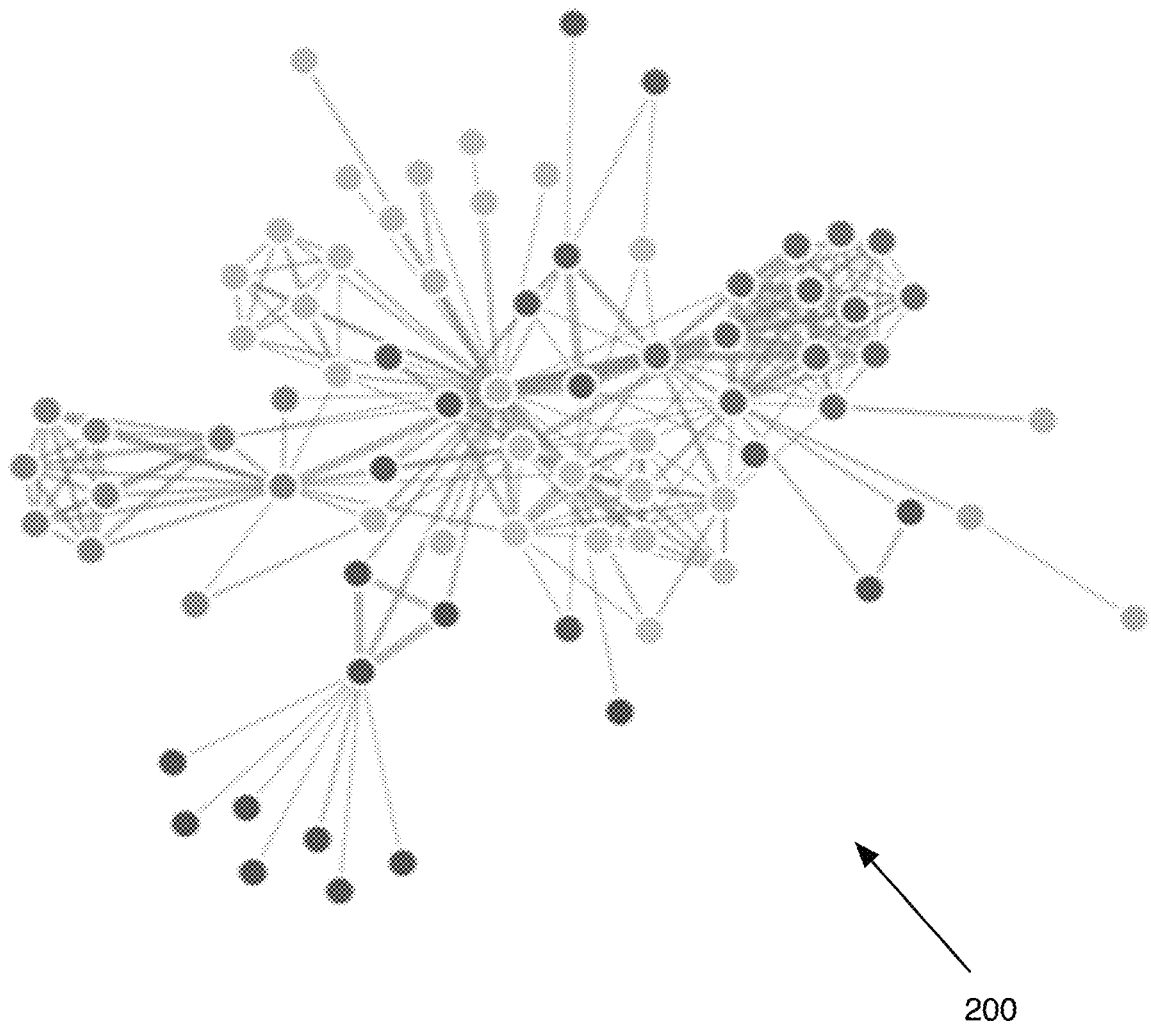
FIG. 2 is an illustration of one embodiment of a force-directed layout graph.
Figures 3, 3A:
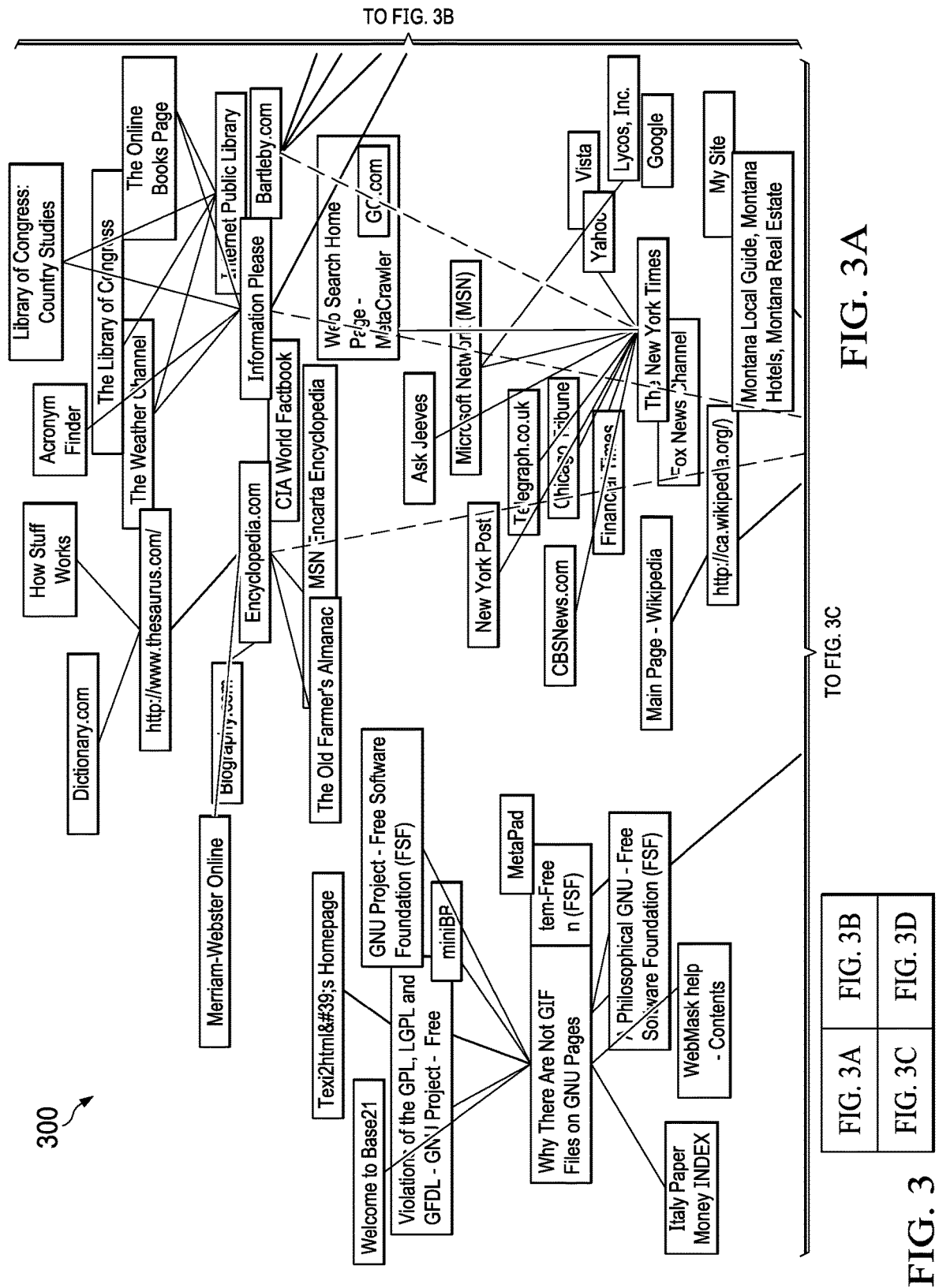
FIGS. 3A-D are illustrations of one embodiment of a force-directed layout graph with multiple nodes and edges.
Figure 3B:
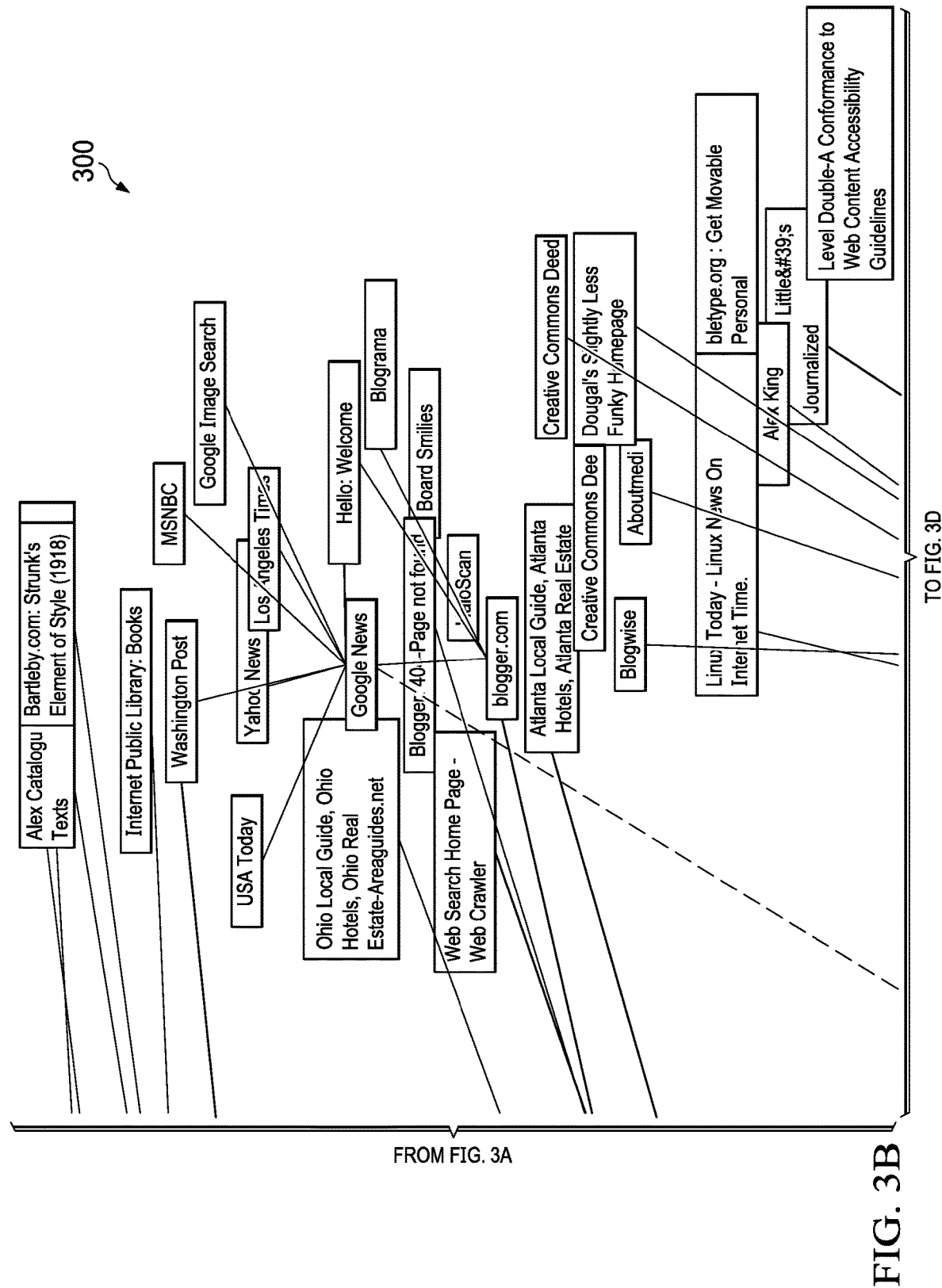
Figure 3C:
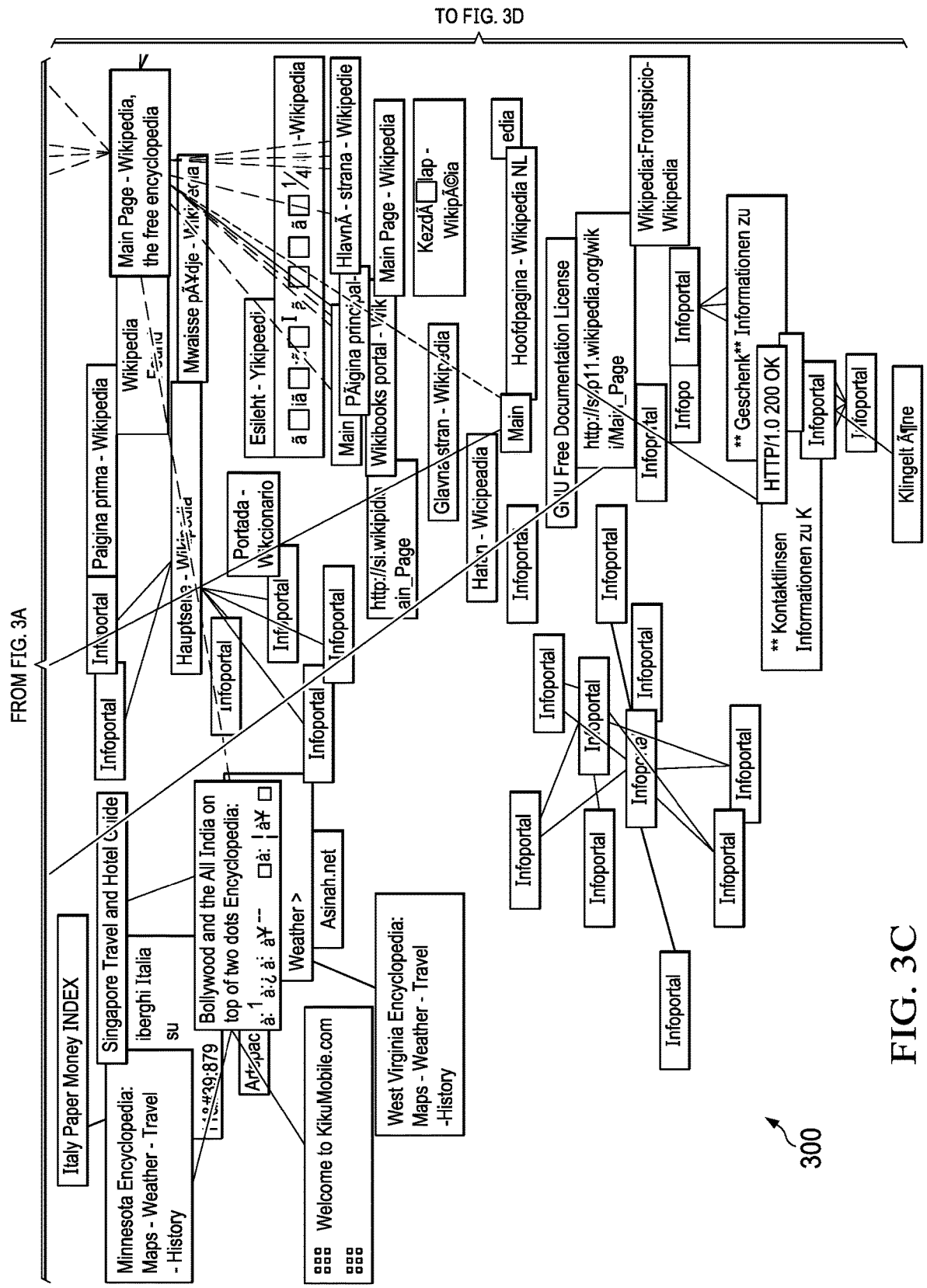
Figure 3D:
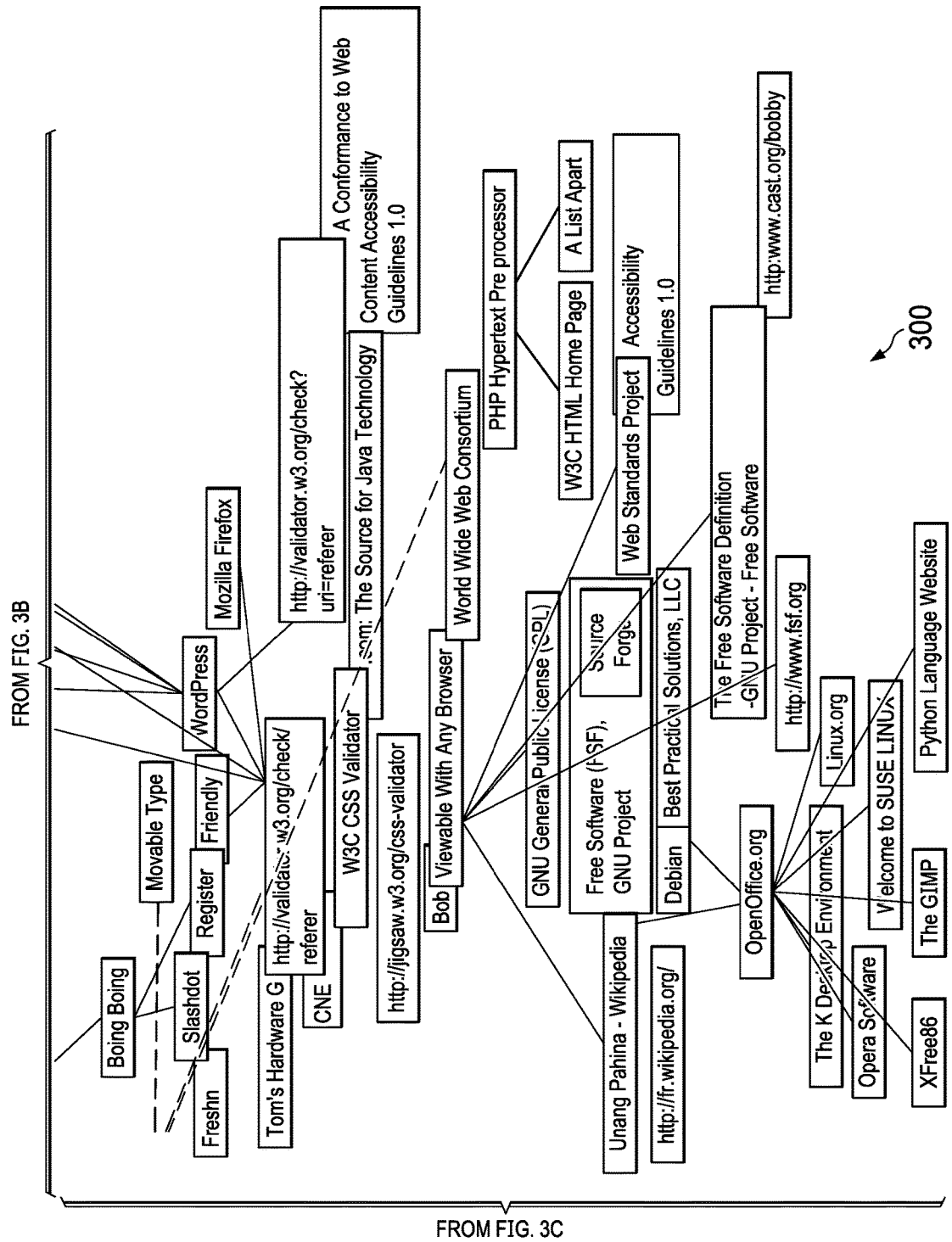

Drawing graphs is often a difficult task, and a large amount of past and current research is devoted to devising visually informative graph layouts. One example of a layout algorithm is the 'force-directed layout', where a physics-based simulation is used to draw the graph. Force-directed layouts have the advantage that they are very easy to set up, and can be generated automatically. However, these layouts (and many other automated layout methods) are often unintuitive, messy, and hard to understand. FIG. 2 is an illustration of one embodiment of a force-directed layout graph 200. In one embodiment, a force-directed graph drawing algorithm is a type of algorithm for drawing graphs in an aesthetically pleasing way. The purpose is to position the nodes of a graph in two-dimensional space so that all the edges are of more or less equal length and there are as few crossing edges as possible, by assigning forces among the set of edges and the set of nodes, based on their relative positions, and using these forces either to simulate the motion of the edges and nodes or to minimize their energy. In FIG. 2, the nodes are coupled to the edge as determined by the forces between the edge-coupled nodes.

One problem with the force-directed layout is that this type of layout can lead to graphs that are not representative of the relationships between the nodes. For example and in one embodiment, in the graph 100, the graph illustrates which friends are connected, but fails to show the geographical relationship (e.g., which friends are located close by). In addition, the force-directed layout graph can be unintuitive, messy and hard to understand. FIGS. 3A-D are illustrations of one embodiment of a force-directed layout graph with multiple nodes and edges. In one embodiment, the graph 300 is a graph representing hyperlinks between various websites, generated using an automated graph layout algorithm. The complexity and scale of the represented information makes it difficult for the automated algorithm to generate a coherent, intuitive layout.

Figure 4:
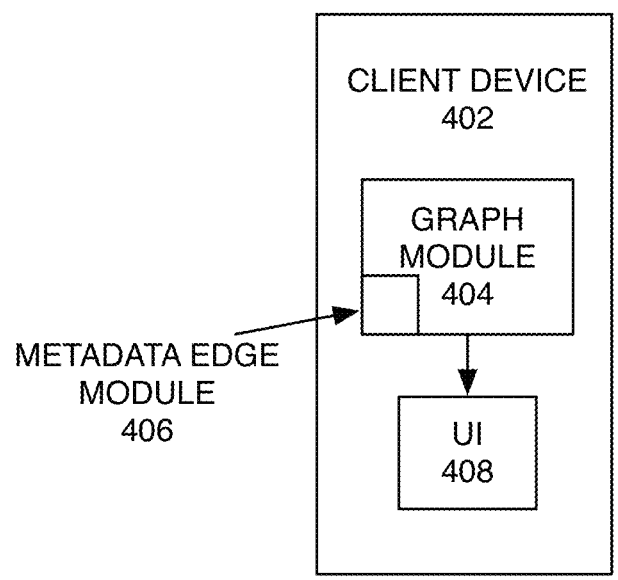
FIG. 4 is a block diagram of one embodiment of a client that uses metadata edges to compute and present a graph.

FIG. 4 is a block diagram of one embodiment of a client 402 that uses metadata edges to compute and present a graph. In FIG. 4, the client 402 includes a graph module 404 that generates a graph to be presented via the user interface 408. In one embodiment, the client device 402 can be a personal computer, laptop, server, mobile device (e.g., smartphone, laptop, personal digital assistant, music playing device, gaming device, etc.), and/or any device capable requesting and/or displaying a query. In one embodiment, the client device 402 can be a physical or virtual device. In one embodiment, the graph module computes a graph using metadata edges for the graph. In one embodiment, the metadata edges are edges that have a repulsive or attracting force (e.g., such as a spring, electrostatic interaction whether positive or negative, or another type of repulsive or attracting force). In this embodiment, the metadata edges, however, are not displayed as are the other edges. Thus, the metadata edge restricts the motion of the nodes coupled to this edge that these nodes can experience during the simulation during a force-directed layout computation.

In one embodiment, the metadata edge module 406 computes the metadata edges using similarity data for the subject of the graph. In one embodiment, similarity data for a pair of nodes in the graph can indicate how similar the nodes are. In one embodiment, the similarity data is context dependent and can be different depending on the type of graph being computed. For example and in one embodiment, for a graph of a chemical molecule or system, the similarity data can be the non-bonding distances between pairs of atoms. In another example, for a social media friendship graph, the similarity data can be geo-location data (e.g., zip code location or another form of location), or other types of similarity for pairs of social media users. Other examples of graphs and similar metrics can be: (i) a graph of academic publications, where edges indicate that one paper cited another, and similarity is measured by the number of common keywords between a pair of papers; (ii) a graph of different languages, where the edges indicate that one language descended from another, and similarity is measured by the languages' geographic overlap; and (iii) a graph of employees in a bureaucracy, where edges indicate a direct supervisory relationship between two employees, and "similarity" is measured by how often two employees work together.

With the similarity data and in one embodiment, the metadata edge module 406 computes the metadata edges using the similarity data and the weight. In one embodiment, the weight can be a constant weight used in the metadata edge calculation or can be a variable weight that is different for different pairs of nodes. In one embodiment, the metadata edge module 406 computes a connectivity for pairs of nodes using the similarity data and the weight. If this connectivity is greater than zero for a pair of nodes, the metadata graph module 406 sets the opacity of the node pair connection to be zero. By setting the opacity to zero, the edge for this node pair will not be displayed in the resulting graph. Computing the graph is further described in FIG. 5 below. The metadata graph module 406 sends the computed graph to the user interface 408, where the user interface 408 displays the graph to the user.

Figure 5:
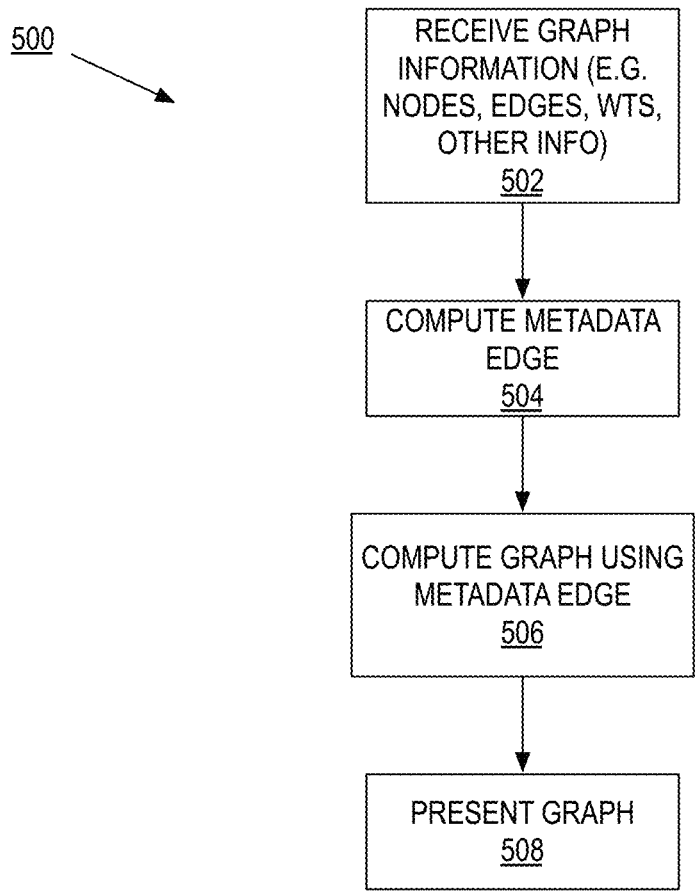
FIG. 5 is a flowchart of one embodiment of a process to use metadata edges to compute and present a graph.

FIG. 5 is a flowchart of one embodiment of a process 500 to use metadata edges to compute and present a graph. In one embodiment, process 500 is performed by a graph module to use metadata edges to compute and present a graph, such as the graph module 404 as described in FIG. 4 above. In FIG. 4, process 500 begins by receiving the graph information at block 502. In one embodiment, the graph information includes a list of graph nodes, edges between the nodes, and other graph information (e.g., edge weights and/or other types of graph information). At block 504, process 500 computes the metadata edges for pairs of nodes using the similarity information of the nodes. Computing the metadata edges is further described in FIG. 6 below. Process 500 computes the graph using the metadata edges at block 506. In one embodiment, process 500 computes the graph using a force-directed layout algorithm. In this embodiment, by using the metadata edges with the force-directed layout, the resulting graph will be graphed using the repulsive and/or attracting forces represented by the metadata edges. At block 508, process 500 presents the computed graph. In one embodiment, process 500 presents the computed graph using a user interface (e.g., a web browser, dedicated graph application, and/or some other type of user interface).

Figure 6:
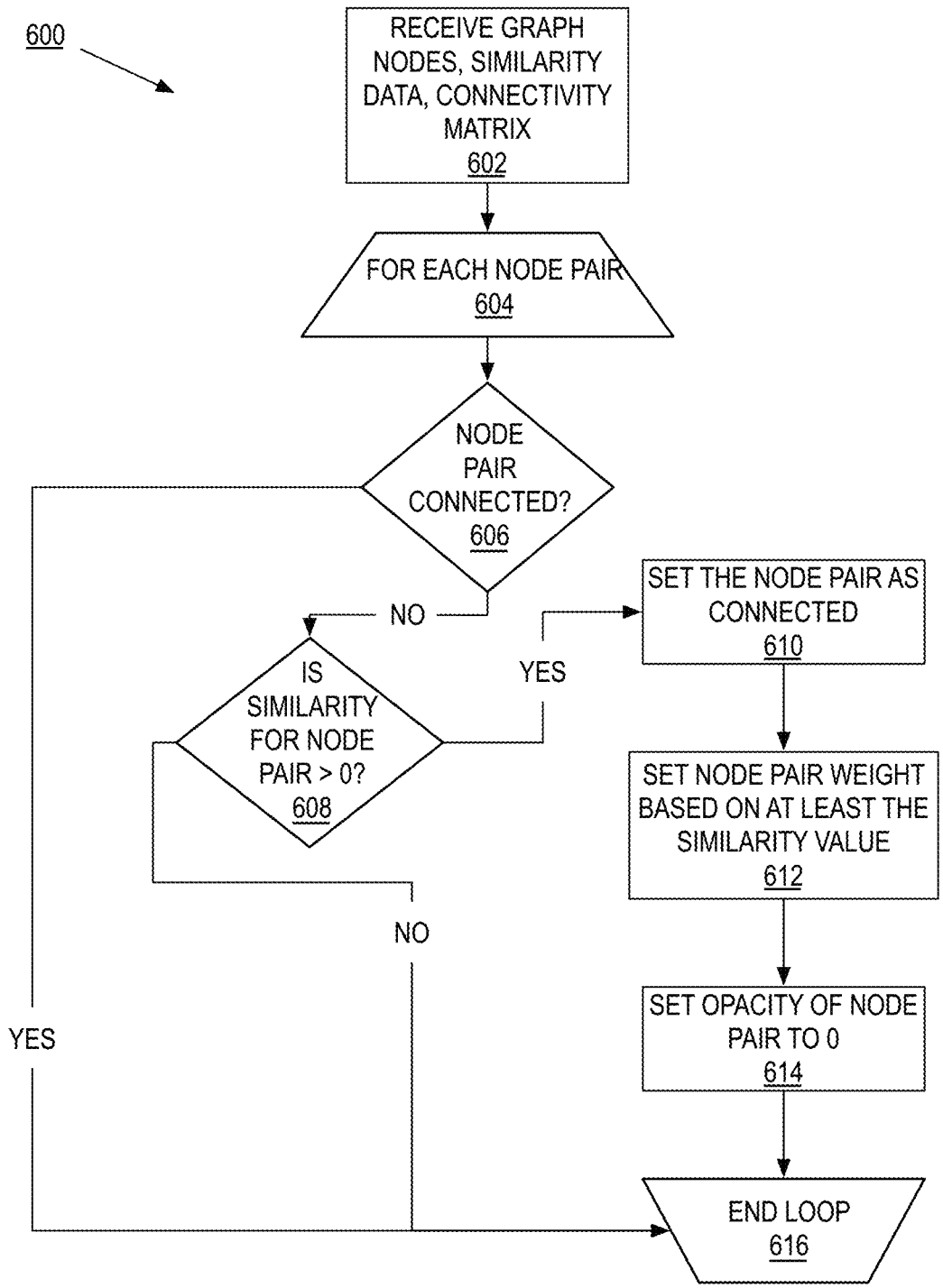
FIG. 6 is a flowchart of one embodiment of a process to compute metadata edges using similarity data.

In FIG. 5 above, process 500 computes the graph using the metadata edges of the graph. FIG. 6 is a flowchart of one embodiment of a process 600 to compute metadata edges using similarity data. In one embodiment, process 600 is performed by metadata edge module to compute metadata edges using similarity data, such as the metadata edge module 406 as described in FIG. 4 above. In FIG. 6, process 600 begins by receiving the graph nodes, similarity information, and connectivity matrix at block 602. In one embodiment, the similarity data for a pair of nodes in the graph can indicate how similar the nodes are. In one embodiment, the similarity data is context dependent and can be different depending on the type of graph being computed. For example and in one embodiment, for a graph of a chemical molecule or system, the similarity data can be the non-bonding distances between pairs of atoms. In another example, for a social media friendship graph, the similarity data can be geo-location data (e.g., zip code location or another form of location), or other types of similarity for pairs of social media users. In one embodiment, the connectivity matrix is a matrix that indicates which pairs of nodes are connected by a visible edge.

Process 600 performs a processing loop (blocks 604-616) to determine the metadata edges for the different pairs of nodes in the graph. At block 606, process 500 determines if the pair of nodes is currently connected with an edge. If the node pair is currently connected, this node pair does not need a metadata edge and execution proceeds to block 616. If the node pair is not connected, this node pair may possibly have a metadata edge between the two nodes. Execution proceeds to block 608. At block 608, process 600 determines if the similarity for the node pair is greater than zero. If the similarity for the node pair is greater than zero, this node pair will have a metadata edge created for the node pair. In one embodiment, the metadata edge for the node pair is set up by setting the node pair as connected in the connectivity matrix, computing a node pair weight using the similarity value for the node pair, and setting the opacity of the node pair to be zero. If the similarity is equal to zero, execution proceeds to block 616, where the loop ends. If the similarity is greater than zero for this node pair, execution proceeds to block 610 below.

At block 610, process 600 sets the connectivity for the node pair to be true. By setting the connectivity of this node pair to be true, the node pair is indicated to have an edge between the two nodes. With an edge between the two nodes, the freedom of movement for these nodes is reduced. Process 600 computes an edge weight for this edge using the similarity data and weight at block 612. In one embodiment, process 600 by multiplying the similarity data for this node pair and a default weight. As per above, the similarity can take a range of values depending on the type of similarity metric being used. In one embodiment, the similarity data can be a 0 or 1 for friendship graphs when comparing geo-location (e.g. if in the same zip code). In another embodiment, the similarity metric can be based on a distance value up to a cut-off value, as shown below. In this embodiment, the edge weight can set the strength and directionality (e.g., attractive or repulsive) of the force between the two nodes. This edge weight can be used for a force-directed layout in computing the graph. At block 614, process 600 sets the opacity for the node pair edge to zero. In one embodiment, by setting the opacity to zero, this metadata edge is not made visible to the user when the graph is presented in the user interface. The processing loop ends at block 616.

Figure 7:
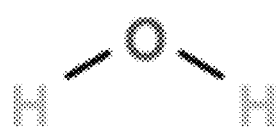
FIG. 7 is an illustration of one embodiment of force-directed layout graphs for water and benzene molecules.
Figure 7:
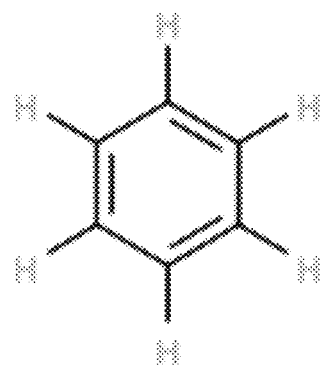

FIG. 7 is an illustration of one embodiment of force-directed layout graphs 702 and 704 for water and benzene molecules. In one embodiment, the graph 702 is a graph of a water molecule. In this embodiment, the similarity data for this graph could be the distance between the two hydrogen molecules, which restricts the motion freedom of the atoms in the water molecule during the force-directed layout. In a further embodiment, the graph 704 is a graph of a benzene ring. In this embodiment, the similarity data for this graph would be inter-atom distances between non-bond atoms. For example and in one embodiment, the similarity data could be the H-H distances.

For example and in one embodiment, the client augments the molecular graph with a similarity metric in which two nodes are maximally similar if they are at the same point in 3D space, and considered maximally dissimilar if they are separated by more than a distance D (which, in these examples, was set to D=3.5 Å):

$$S(i, j) = \begin{cases} \left(1 - \dfrac{d_{ij}}{D}\right)^2 & \text{if } d_{ij} < D \\ 0 & \text{otherwise} \end{cases}$$

where $d_{ij}$ is the distance in 3D space between nodes i and j.

Figure 8:
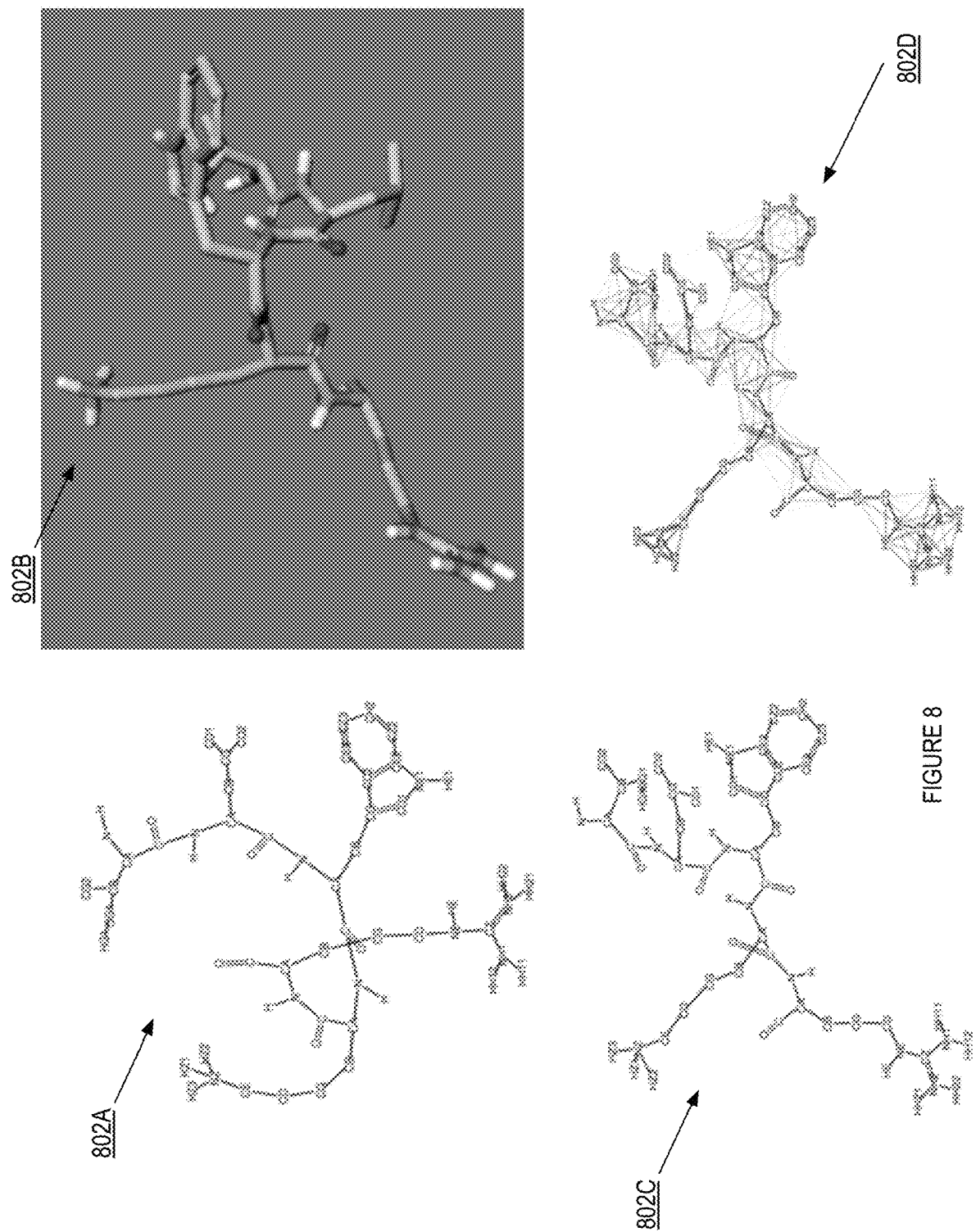
FIG. 8 is an illustration of one embodiment of force-directed layout graphs with and without metadata edges for a pentapeptide molecule, Arginine-Lysine-Tryptophan-Leucine-Valine.
Figures 10, 10A:
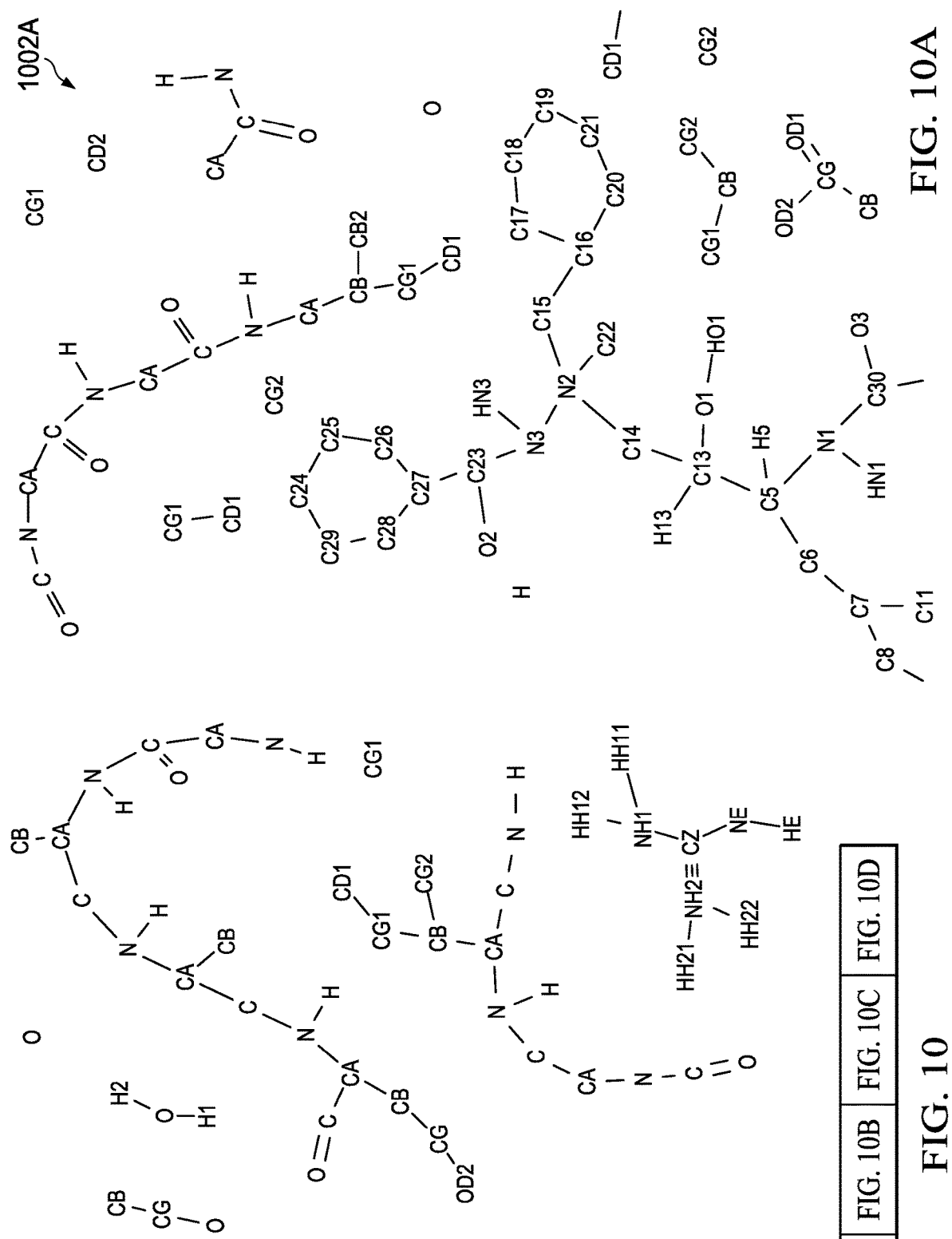
FIGS. 10A-D are illustrations of one embodiment of force-directed layout graphs with and without metadata edges of a drug molecule interacting with a protein.
Figure 10B:
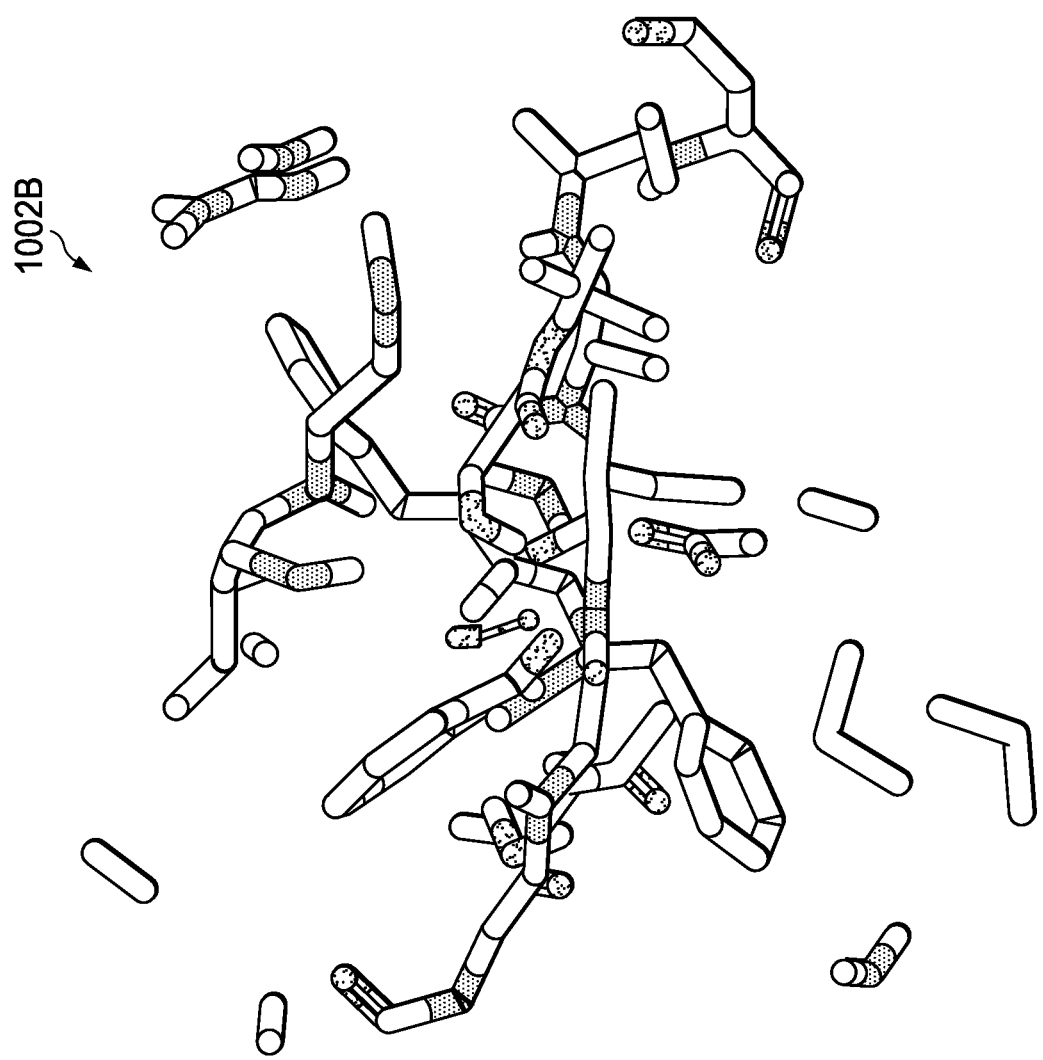
Figure 10C:
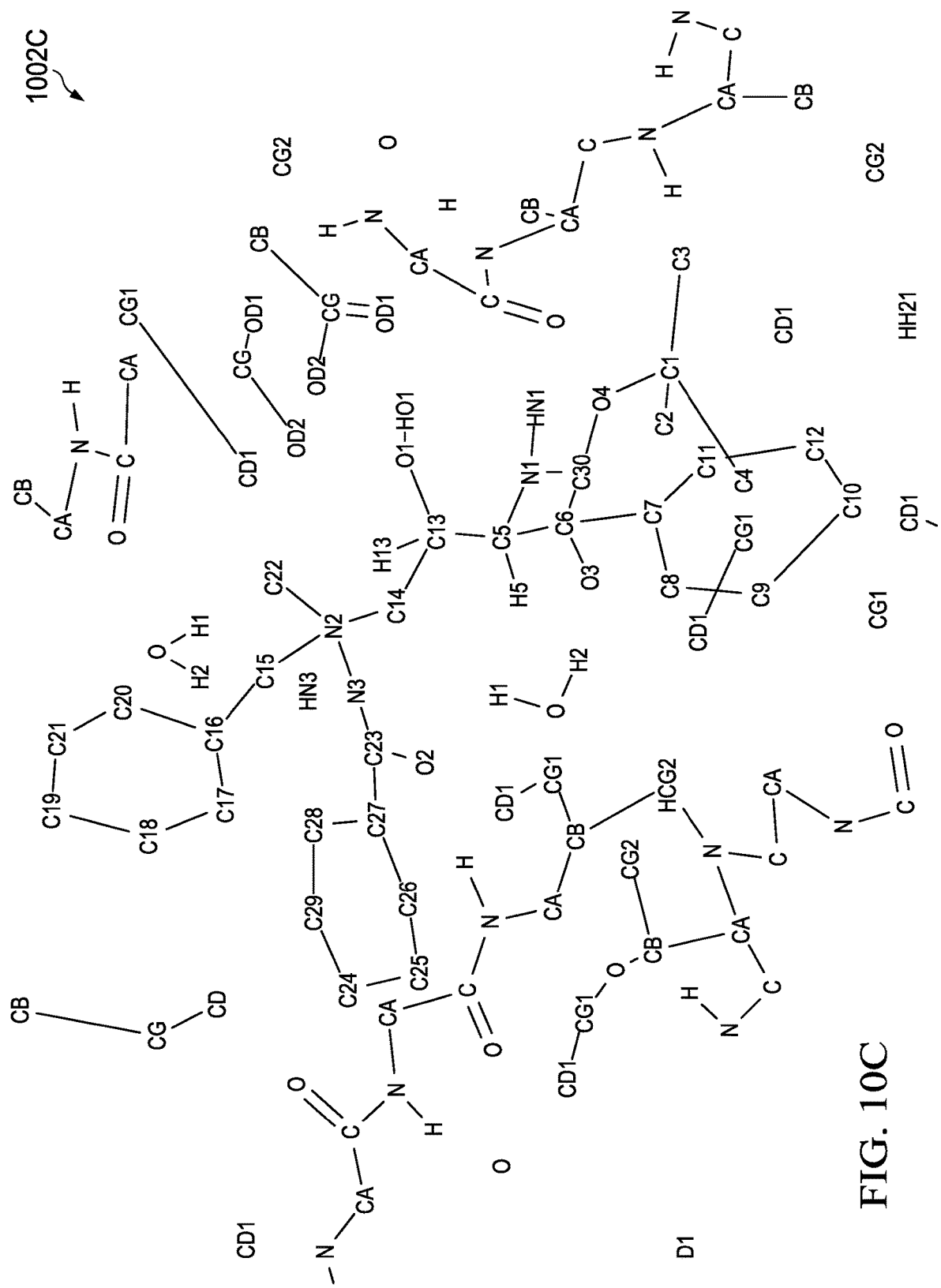
Figure 10D:
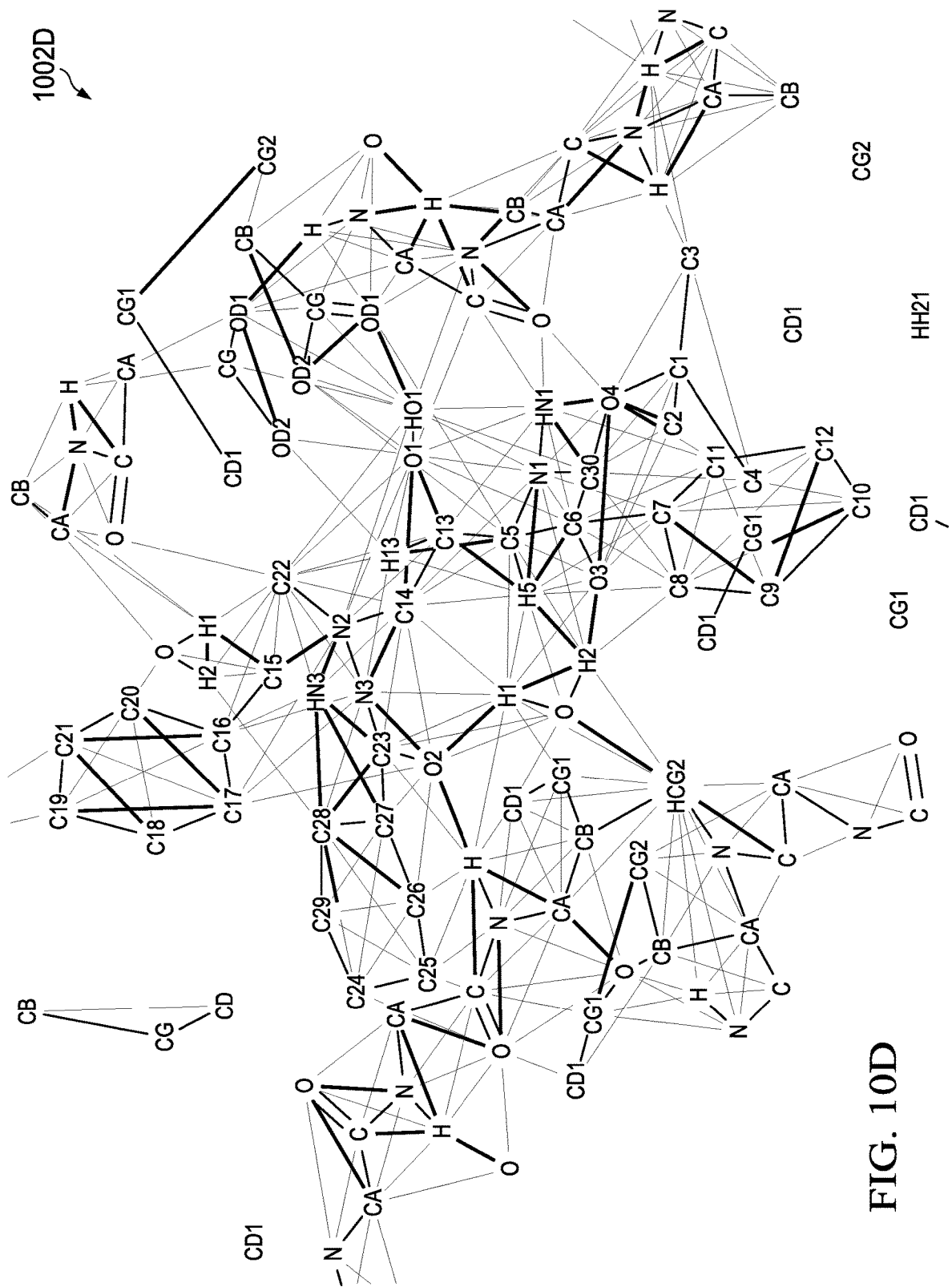

FIG. 8 is an illustration of one embodiment of force-directed layout graphs with and without metadata edges for a pentapeptide molecule, Arginine-Lysine-Tryptophan-Leucine-Valine. In FIG. 10, the illustrations 802A-D illustrate different views of this pentapeptide. View 802A is a force-directed layout graph of the molecule without using the metadata edges. Without using these metadata edges, the straight-forward force-directed layout of the molecule pushes the atoms out so that the atoms are equally away from each as the algorithm dictates. This distortion of the molecule structure is seen as compared to the three-dimensional structure 802, where the basic force-directed layout graph 802A lacks the similar features as the three-dimensional structure of the molecule. This is because the force-directed layout structure 802A lacks the three-dimensional relationships between the non-bonded (e.g., not connected) atoms.

In one embodiment, the metadata edges for the molecule are these three-dimensional relationships between the atoms in the molecule, such as some or all of the intra-atoms distance between non-connected atoms. In this embodiment, these non-connected intra-atoms distances can be derived from the three-dimensional structure of the molecule (e.g., crystal structure, computational chemistry calculation, and/or another way of determining three-dimensional structure information for a molecule). In one embodiment, by using the metadata edges derived from the three-dimensional structure, a force-directed layout graph of the molecule 802C appears closer to a two-dimensional projection of the three-dimensional molecular structure. This graph 802C uses the metadata edges to constrain the force-directed layout of the molecular graph 802C without adding visible edges to the graph 802C. In one embodiment, the metadata edges for the graph 802C are for the atoms that are within close proximity to each other without being connected (e.g., bonded). The metadata edges used for the force-directed layout graph 802C is illustrated in 802D.

Figure 9:
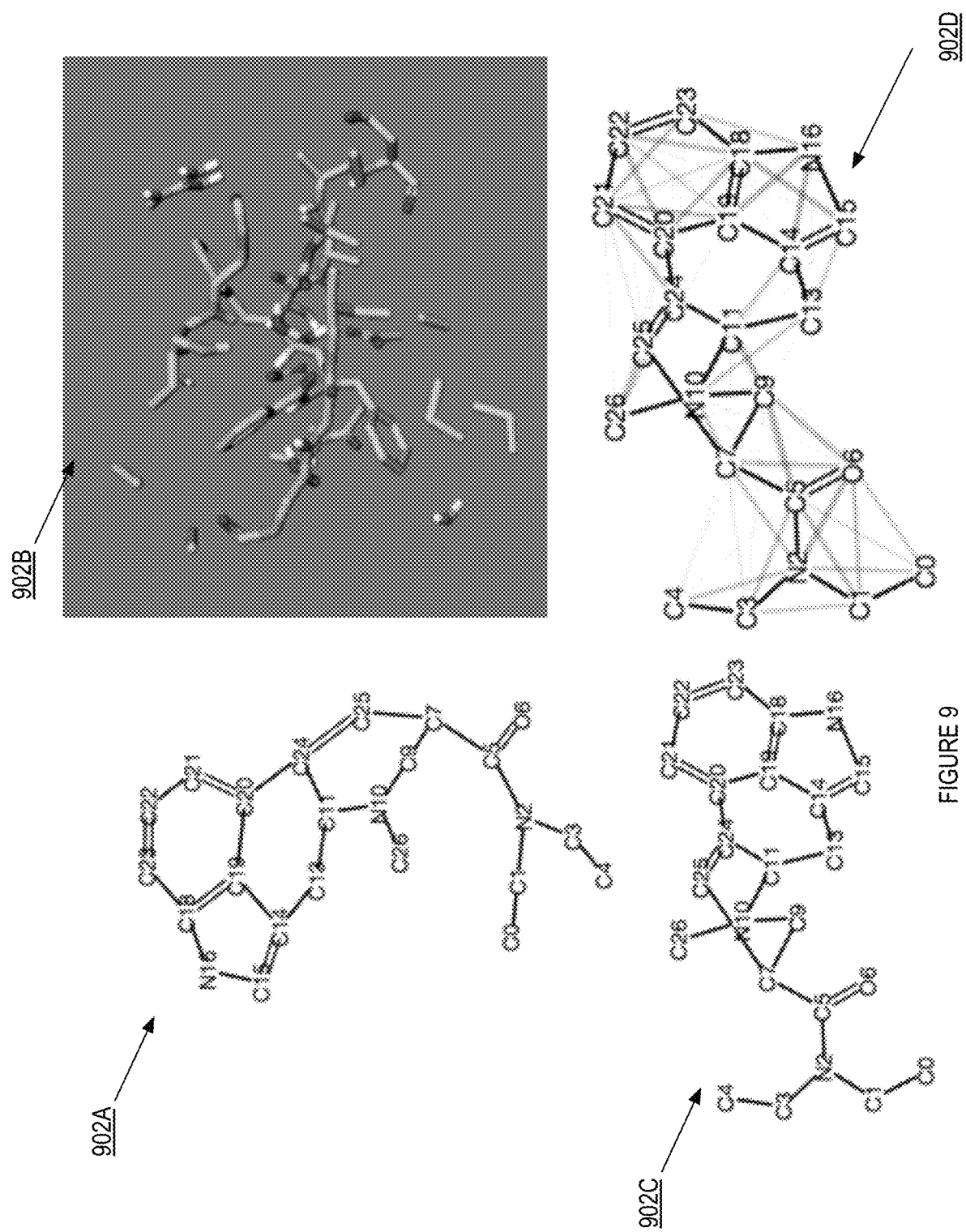
FIG. 9 is an illustration of one embodiment of force-directed layout graphs with and without metadata edges for lysergic acid diethylamide.

FIG. 9 is an illustration of one embodiment of force-directed layout graphs with and without metadata edges for lysergic acid diethylamide. In FIG. 9, the illustrations 902A-D illustrate different views of lysergic acid diethylamide ((6aR,9R)—N,N-diethyl-7-methyl-4,6,6a,7,8,9-hexahydroindolo-[4,3-fg]quinoline-9-carboxamide). View 902A is a force-directed layout graph of the molecule without using the metadata edges. Without using these metadata edges, the straight-forward force-directed layout of the molecule pushes the atoms out so that the atoms are equally away from each as best possible. This distortion of the molecule structure is seen as compared to the three-dimensional structure 902B, where the basic force-directed layout graph 902A lacks the same features as the three-dimensional structure of the molecule. This is because the force-directed layout structure 902A lacks the three-dimensional relationships between the non-bonded (e.g., not connected) atoms.

In one embodiment, the metadata edges for the molecule are these three-dimensional relationships between the atoms in the molecule, such as some or all of the intra-atoms distance between non-connected atoms. In this embodiment, these non-connected intra-atoms distances can be derived from the three-dimensional structure of the molecule (e.g., crystal structure, computational chemistry calculation, and/or another way of determining three-dimensional structure information for a molecule). In one embodiment, by using the metadata edges derived from the three-dimensional structure, a force-directed layout graph of the molecule 902C appears closer to a two-dimensional projection of the three-dimensional molecular structure. This graph 902C uses the metadata edges to constrain the force-directed layout of the molecular graph 902C without adding visible edges to the graph 902C. In one embodiment, the metadata edges for the graph 902C are for the atoms that are within close proximity to each other without being connected (e.g., bonded). The metadata edges used for the force-directed layout graph 902C is illustrated in 902D.

FIGS. 10A-D are illustrations of one embodiment of force-directed layout graphs with and without metadata edges of a drug molecule interacting with a protein. In FIG. 10, the illustrations 1002A-D illustrate different views of a 2d graph showing how a small drug molecule is in contact with surrounding atoms in a protein. The graph shows both the drug molecule and other atoms within 3 Å of the drug. This is a visualization of the molecular structure named "3AID" in the RCSB protein databank. The protein is the Q7K mutation of HIV-1 Protease, and the drug molecule is BENZOYLAMINO-BENZYL-METHYL-[2-HYDROXY-3-[1-METHYL-ETHYL-OXY-N-FORMAMIDYL]-4-PHENYL-BUTYL]-AMMONIUM (Also referred to informally as an "HIV protease inhibitor").

View 1002A is a force-directed layout graph of the molecule without using the metadata edges. Without using these metadata edges, the straight-forward force-directed layout of the molecule pushes the atoms out so that the atoms are equally away from each as best possible. This distortion of the molecule structure is seen as compared to the three-dimensional structure 1002B, where the basic force-directed layout graph 1002A lacks the same features as the three-dimensional structure of the molecule. This is because the force-directed layout structure 1002A lacks the three-dimensional relationships between the non-bonded (e.g., not connected) atoms.

In one embodiment, the metadata edges for the molecule are these three-dimensional relationships between the atoms in the molecule, such as some or all of the intra-atoms distance between non-connected atoms. In this embodiment, these non-connected intra-atoms distances can be derived from the three-dimensional structure of the molecule in the protein environment (e.g., crystal structure, computational chemistry calculation, and/or another way of determining three-dimensional structure information for a molecule). In one embodiment, by using the metadata edges derived from the three-dimensional structure, a force-directed layout graph of the molecule 1002C appears closer to a two-dimensional projection of the three-dimensional molecular structure. This graph 1002C uses the metadata edges to constrain the force-directed layout of the molecular graph 1002C without adding visible edges to the graph 1002C. In one embodiment, the metadata edges for the graph 1002C are for the atoms that are within close proximity to each other without being connected (e.g., bonded). The metadata edges used for the force-directed layout graph 1002C is illustrated in 1002D.

Figure 11:
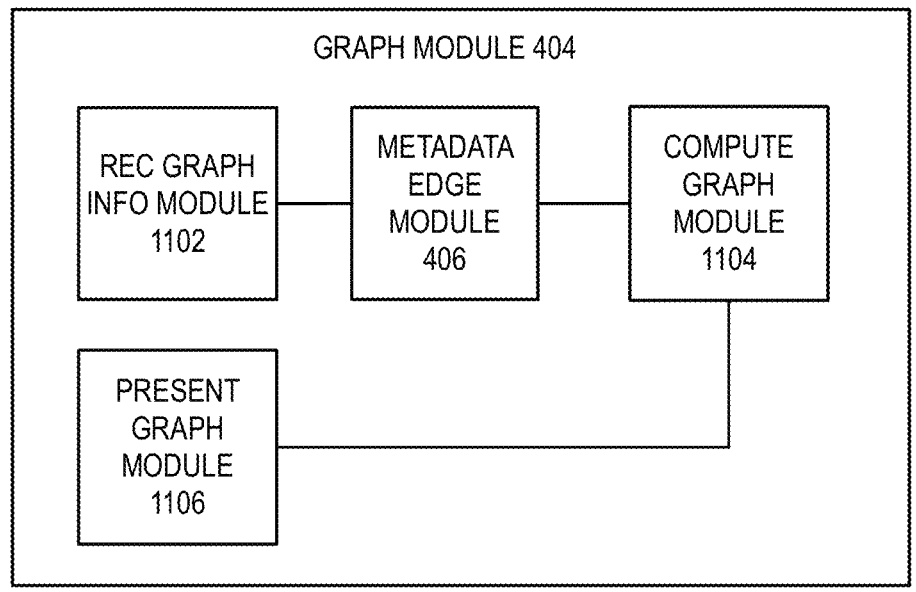
FIG. 11 is a block diagram of one embodiment of a graph module to use metadata edges to compute and present a graph.

FIG. 11 is a block diagram of one embodiment of a graph module 404 to use metadata edges to compute and present a graph. In one embodiment, the graph module 404 includes a receive graph information module 1102, metadata edge module 406, compute graph module 1104, and present graph module 1108. In one embodiment, the receive graph information module 1102 receives the graph information as described in FIG. 5, block 502 above. The metadata edge module 406 computes the metadata edges as described in FIG. 5, block 504 above. The compute graph module 1104 computes the graph using the metadata edges as described in FIG. 5, block 506 above. The present graph module 1108 presents the graph as described in FIG. 5, block 508 above.

Figure 12:
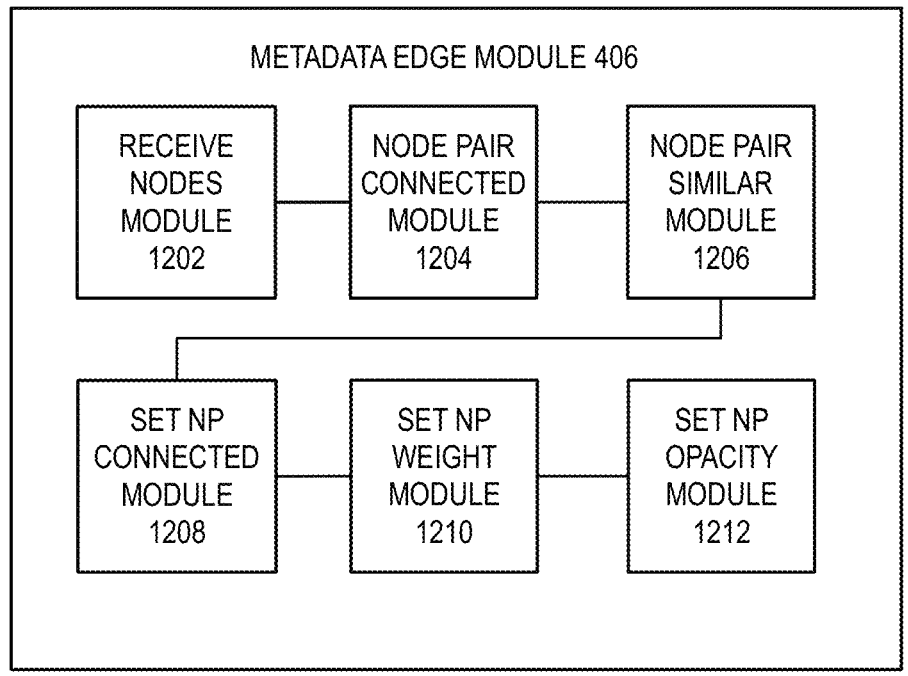
FIG. 12 is a block diagram of one embodiment of a metadata edge module to compute metadata edges using similarity data.

FIG. 12 is a block diagram of one embodiment of a metadata edge module 406 to compute metadata edges using similarity data. In one embodiment, the metadata edge module 406 includes a receive nodes module 1202, node pair connected module 1204, node pair similar module 1206, set node pair connected module 1208, set node pair weight module 1210, and set node pair opacity module 1212. In one embodiment, the receive nodes module 1202 receives the node information as described in FIG. 6, block 602 above. The node pair connected module 1204 as described in FIG. 6, block 606 above. The node pair similar module 1206 determines if the nodes in the pair are similar as described in FIG. 6, block 608 above. The set node pair connected module 1208 sets the node pair as connected as described in FIG. 6, block 610 above. The set node pair weight module 1210 sets the weight for the node pair as described in FIG. 6, block 612 above. The set node pair opacity module 1212 set the opacity for the node pair as described in FIG. 6, block 614 above.

Figure 13:
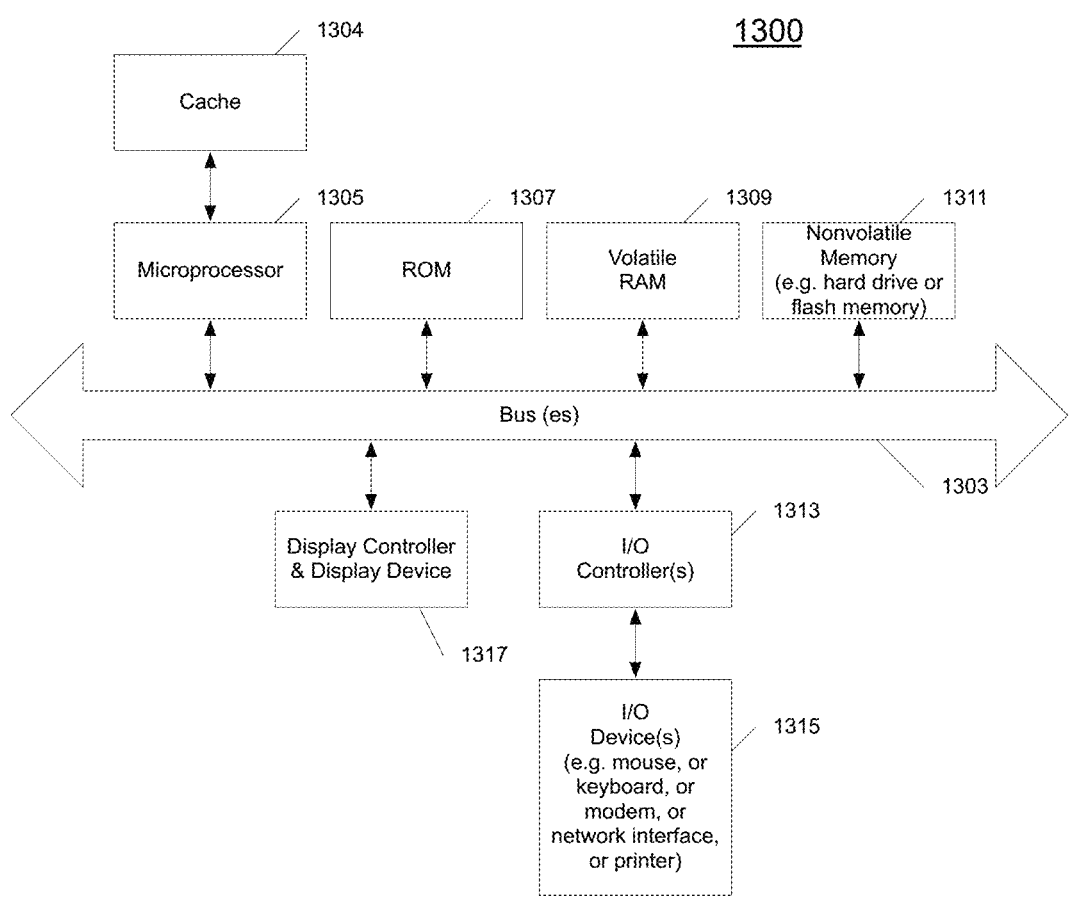
FIG. 13 shows an example of a data processing system, which may be used with one embodiment of the present invention.

FIG. 13 shows one example of a data processing system 1300, which may be used with one embodiment of the present invention. For example, the system 1300 may be implemented including a client device 402 as shown in FIG. 4. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may include one or more CPU(s), GPU(s), a specialized processor, and/or a combination thereof. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "setting," "computing," "receiving," "receiving," "presenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to compute a graph layout of a graph using non-visible metadata edges, the method comprising:

receiving graph information of the graph for a plurality of nodes, wherein a first subset of the plurality of nodes are connected by visible edges and the graph is a multi-dimensional graph of at least three dimensions;

determining a plurality of metadata edges for a second subset of nodes that are not connected by visible edges, wherein the plurality of metadata edges constrains an inter-nodal distance layout for one or more pairs of nodes of the second subset of the plurality of nodes, each of the plurality of metadata edge are not visible, each of the plurality of metadata edges includes a layout constraint strength that represents a layout force for a node pair associated with that metadata edge and used for computing the graph layout, and each of the plurality of metadata edges is based on at least a similarity between a node pair associated with this metadata edge and a default weight;

computing the graph layout of the graph using a simulation involving at least the visible edges and the plurality of metadata edges and the graph layout is a two-dimensional representation of the graph; and presenting the graph layout using a user interface.

2. The machine-readable medium of claim 1, wherein the determining of the plurality of metadata edge comprises:

for each possible pair of the plurality of nodes, determining if the possible pair of nodes is connected with a visible edge, and if this possible pair of nodes is not connected with a visible edge, determining if this possible pair of nodes is similar, and if this possible pair of nodes is similar, setting this possible pair of nodes as connected, setting a weight for this possible pair of nodes, and setting an opacity for an edge of the possible pair of nodes to be non-visible.

3. The machine-readable medium of claim 2, wherein the setting of the weight comprises:

computing the weight based on at least a similarity value of this possible pair of nodes and the default weight.

4. The machine-readable medium of claim 2, wherein the non-visible opacity for an edge of the possible pair of nodes is zero.

5. The machine-readable medium of claim 2, wherein this possible pair of nodes is similar if a similarity value for this possible pair of nodes is non-zero.

6. The machine-readable medium of claim 5, wherein a similarity value is selected from the group consisting of atomic distance and geo-location.

7. The machine-readable medium of claim 1, wherein the simulation is a force-directed layout.

8. A method to compute a graph using non-visible metadata edges, the method comprising:

receiving graph information of the graph for a plurality of nodes, wherein a first subset of the plurality of nodes are connected by visible edges and the graph is a multi-dimensional graph of at least three dimensions;

determining a plurality of metadata edges for a second subset of nodes that are not connected by visible edges, wherein the plurality of metadata edges constrains an inter-nodal distance layout for one or more pairs of nodes of the second subset of the plurality of nodes, each of the plurality of metadata edge are not visible, each of the plurality of metadata edges includes a layout constraint strength that represents a layout force for a node pair associated with that metadata edge and used for computing the graph layout, and each of the plurality of metadata edges is based on at least a similarity between a node pair associated with this metadata edge and a default weight;

computing the graph layout of the graph using a simulation involving at least the visible edges and the plurality of metadata edges and the graph layout is a two-dimensional representation of the graph; and presenting the layout graph using a user interface.

9. The method of claim 8, wherein the determining of the plurality of metadata edge comprises:
for each possible pair of the plurality of nodes,
determining if the possible pair of nodes is connected with a visible edge, and
if this possible pair of nodes is not connected with a visible edge,
determining if this possible pair of nodes is similar, and
if this possible pair of nodes is similar,
setting this possible pair of nodes as connected,
setting a weight for this possible pair of nodes, and
setting an opacity for an edge of the possible pair of nodes to be non-visible.

10. The method of claim 9, wherein the setting of the weight comprises:
computing the weight based on at least a similarity value of this possible pair of nodes and the default weight.

11. The method of claim 9, wherein the non-visible opacity for an edge of the possible pair of nodes is zero.

12. The method of claim 9, wherein this possible pair of nodes is similar if a similarity value for this possible pair of nodes is non-zero.

13. The method of claim 12, wherein a similarity value is selected from the group consisting of atomic distance and geo-location.

14. The method of claim 8, wherein the simulation is a force-directed layout.

15. A device to compute a graph layout of a graph using non-visible metadata edges, the device comprising:
a processor;
a memory coupled to the processor though a bus; and
a process executed from the memory by the processor that causes the process to receive graph information of the graph for a plurality of nodes, wherein a first subset of the plurality of nodes are connected by visible edges, determine a plurality of metadata edges for a second subset of nodes that are not connected by visible edges, compute the graph layout of the graph using a simulation involving at least the visible edges and the plurality of metadata edges, and present the graph using a user interface, wherein the plurality of metadata edges constrains an inter-nodal distance layout for one or more pairs of nodes of the second subset of the plurality of nodes, each of the plurality of metadata edge are not visible, and each of the plurality of metadata edges includes a layout constraint strength that represents a layout force for a node pair associated with that metadata edge and used for computing the graph layout, each of the plurality of metadata edges is based on at least a similarity between a node pair associated with this metadata edge and a default weight, the graph is a multi-dimensional graph of at least three dimension, and the graph layout is a two-dimensional representation of the graph.

16. The device of claim 15, wherein the processor further causes the process to determine of the plurality of metadata edge by,
for each possible pair of the plurality of nodes,
determining if the possible pair of nodes is connected with a visible edge, and
if this possible pair of nodes is not connected with a visible edge,
determining if this possible pair of nodes is similar, and
if this possible pair of nodes is similar,
setting this possible pair of nodes as connected,
setting a weight for this possible pair of nodes, and
setting an opacity for an edge of the possible pair of nodes to be non-visible.

17. The device of claim 16, wherein the processor further causes the process to setting of the weight by,
computing the weight based on at least a similarity value of this possible pair of nodes and the default weight.

18. The device of claim 16, wherein the non-visible opacity for an edge of the possible pair of nodes is zero.

19. The device of claim 16, wherein this possible pair of nodes is similar if a similarity value for this possible pair of nodes is non-zero.

20. The device of claim 15, wherein the simulation is a force-directed layout.

* * * * *